US012220792B2

(12) United States Patent
Corsi et al.

(10) Patent No.: US 12,220,792 B2
(45) Date of Patent: Feb. 11, 2025

(54) CLAMPING TOOL WITH DISPLAY DEVICE FOR TIGHTENING CONDITIONS

(71) Applicant: ATLAS COPCO INDUSTRIAL TECHNIQUE AB, Stockholm (SE)

(72) Inventors: Marco Corsi, Paderno Dugnano (IT); Massimiliano Cattaneo, Carate Brianza (IT)

(73) Assignee: ATLAS COPCO INDUSTRIAL TECHNIQUE AB, Stockholm (SE)

(*) Notice: Subject to any disclaimer, the term of this patent is extended or adjusted under 35 U.S.C. 154(b) by 332 days.

(21) Appl. No.: 17/775,806

(22) PCT Filed: Dec. 17, 2020

(86) PCT No.: PCT/IB2020/062091
§ 371 (c)(1),
(2) Date: May 10, 2022

(87) PCT Pub. No.: WO2021/124184
PCT Pub. Date: Jun. 24, 2021

(65) Prior Publication Data

US 2022/0388133 A1 Dec. 8, 2022

(30) Foreign Application Priority Data

Dec. 19, 2019 (IT) ........................ 102019000024736

(51) Int. Cl.
*B25B 23/142* (2006.01)
*B25B 23/00* (2006.01)

(52) U.S. Cl.
CPC ...... *B25B 23/1425* (2013.01); *B25B 23/0035* (2013.01)

(58) Field of Classification Search
CPC ............ B25B 23/1425; B25B 23/0035; B25B 23/0042; G09G 3/20; G09G 3/2093; G09G 3/002; G09G 2300/023; G09G 2300/0426
See application file for complete search history.

(56) References Cited

U.S. PATENT DOCUMENTS 5,473,519 A * 12/1995 McCallops ............. B25F 5/021 362/120
8,555,755 B2 * 10/2013 Cattaneo ............. B25B 23/1425 73/761

(Continued)

FOREIGN PATENT DOCUMENTS

DE 10 2004 043 217 A1 3/2005
DE 20 2008 013 838 U1 5/2009

OTHER PUBLICATIONS

International Preliminary Report on Patentability completed on Dec. 7, 2021 in PCT/IB2020/062091 filed on Dec. 17, 2020, 5 pages.

(Continued)

*Primary Examiner* — David B. Thomas
(74) *Attorney, Agent, or Firm* — Oblon, McClelland, Maier & Neustadt, L.L.P.

(57) ABSTRACT

Clamping tool provided of a tightening conditions display device comprising a body (11), containing control circuits and a processing electronic unit having at one end a handle (12) for gripping by an operator making the clamping, and on the other end an arm (13). Said arm comprises a seat (16) wherein can be alternatively pluggable a plurality of inserts suitable for engaging the tool with a corresponding type and/or dimension of a mechanical member on which the tool is destined to operate to carry out a clamping operation. Sensor means are provided on said arm suitable for detecting tightening conditions exerted on said mechanical member (Continued)

and said display device is controlled by said electronic processing unit and comprises an annular support (2) connected to the tool, to which a plurality of lighting groups (3) are associated, provided along a circle arch long the ring and each one comprising at least two lighting points (4), the groups (3) being substantially equidistant each other along the ring, said points being destined to lighten when the clamping is finished.

5 Claims, 1 Drawing Sheet

(56) References Cited

U.S. PATENT DOCUMENTS

| | | | | |
|---|---|---|---|---|
| 9,320,558 | B2 * | 4/2016 | Cattaneo | B25B 23/1425 |
| 11,583,985 | B2 * | 2/2023 | Hendel | B25B 23/1425 |
| 11,752,604 | B2 * | 9/2023 | King | B25B 23/1475 81/52 |
| 11,766,770 | B2 * | 9/2023 | Silha | B25B 13/10 81/52 |
| 11,794,320 | B2 * | 10/2023 | King | B25B 23/14 |
| 11,845,165 | B2 * | 12/2023 | Hsieh | B25B 23/16 |
| 2009/0165608 | A1 * | 7/2009 | Li | B25B 23/1422 81/489 |
| 2014/0331831 | A1 * | 11/2014 | King | B25B 23/1425 81/479 |
| 2019/0314962 | A1 | 10/2019 | King et al. | |
| 2019/0314964 | A1 | 10/2019 | King et al. | |

OTHER PUBLICATIONS

International Search Report mailed on Feb. 18, 2021 in PCT/IB2020/062091 filed Dec. 17, 2020 (4 pages).

* cited by examiner

CLAMPING TOOL WITH DISPLAY DEVICE FOR TIGHTENING CONDITIONS

BACKGROUND OF THE INVENTION

The present invention refers to an electronic tool for the controlled clamping of mechanical members; such tool can be for example a torque wrench in which it is possible to check the tightening torque exerted on the bolt to be clamped.

Clamping tools are known in the art which comprise a body, containing the various control and, optionally, actuation members, to which one of several removable inserts is coupled, each of which is destined to engage a corresponding type of mechanical member (e.g. example, the head of a screw, with male or female coupling) on which the tool is destined to operate.

Electronic tools of this type comprise sensors, including a torque sensor, for detecting the torque exerted on the mechanical member and other quantities of interest, so as to allow a controlled clamping of the mechanical member by means of suitable processing means which show various parameters of interest to the operator and, if necessary, command the execution of the clamping operation. Patent EP2326464 describes a tool of this type in the form of a torque wrench, which comprises a body, containing the control circuits and processing unit of the wrench, at one end a handle (advantageously containing rechargeable batteries for powering the wrench) and on the other end an arm. Advantageously, a display for visualizing information and operating data is provided on the body and a keyboard allows data and commands to be entered. A tool head which must be coupled with the type of mechanical member (for example, the head of a screw, with male or female coupling) on which the wrench is destined to operate is inserted interchangeably in a special seat at the end of the arm.

The sensors that measure the torque to be exerted on the member to be clamped are placed on the arm and comprise at least one strain gauge, which is a sensor whose electrical resistance varies with the deformation it undergoes; so it converts the force, pressure, voltage, weight, etc., into a variation in electrical resistance that can be measured.

The value of the torque exerted is normally available on the wrench display or is indicated near it by means of special light and/or acoustic signalings.

The Applicant noted that sometimes depending on how the wrench is held by the operator, the light signalings of the tightening conditions may not always be recognizable, perhaps because the light source is not directly in the operator's field of vision, or it may not always be clear.

The Applicant posed the problem of how to make this light signalling of the tightening conditions always visible and uniquely recognizable in any condition in which the wrench is held by the operator.

BRIEF SUMMARY OF THE INVENTION

The object of the present invention is to obviate the aforementioned drawbacks by proposing a clamping tool having the characteristics of claim 1.

BRIEF DESCRIPTION OF THE SEVERAL VIEWS OF THE DRAWINGS

Further objects and advantages of the present invention will become clear from the following description and from the attached drawings, provided purely by way of non-limiting example, in which.

DETAILED DESCRIPTION OF THE INVENTION

Figure 1:
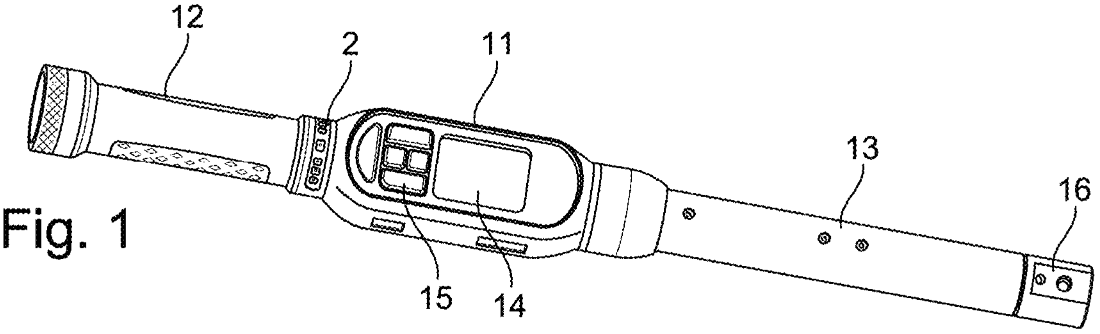
FIG. 1 is a perspective view of the clamping tool according to the present invention.
Figure 2:
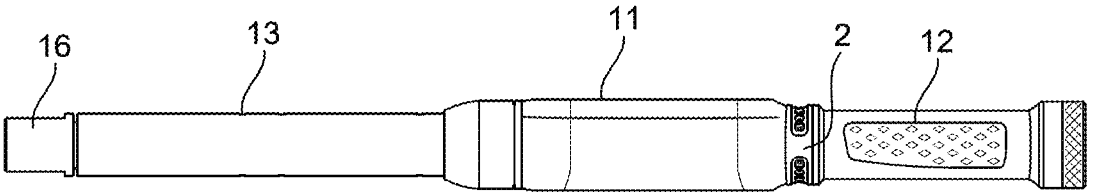
FIGS. 2 and 3 are front and rear views of the tool of FIG. 1.
Figure 3:
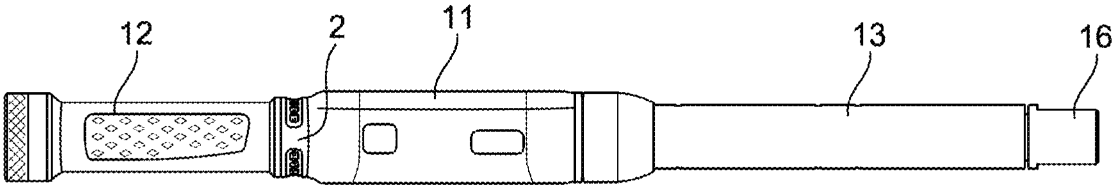
Figure 4:
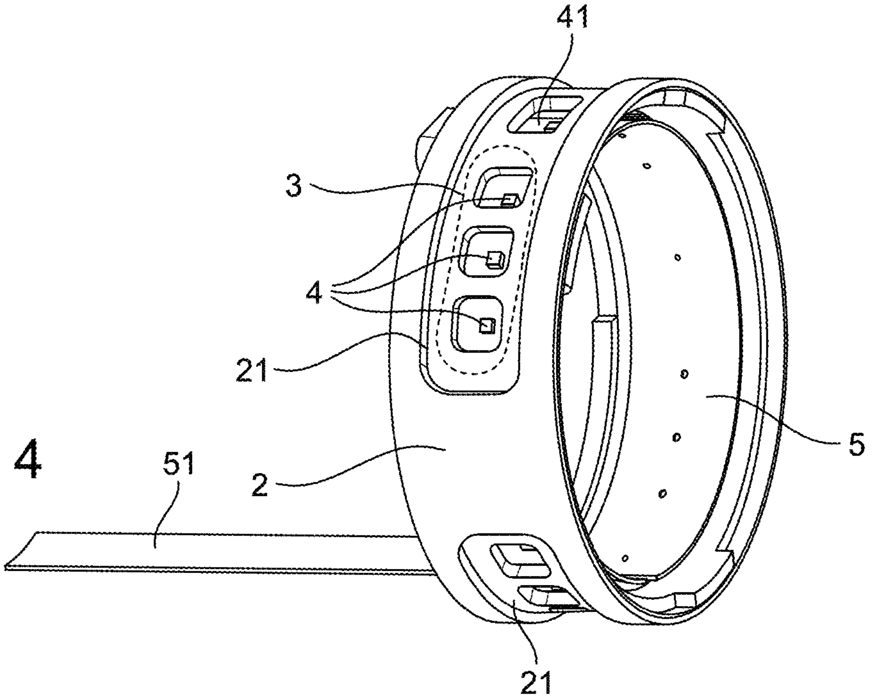
FIG. 4 is a perspective view of the light signalling device of the tightening conditions according to the present invention.

With reference to the aforementioned figures, the clamping tool according to the present invention comprises a body 11 containing electronic control circuits and a processing electronic unit having at one end a handle 12 (preferably containing rechargeable batteries for powering the wrench) and on the other end an arm 13. Advantageously, a display 14 for visualizing information and operating data is provided on the body 11 and a keyboard 15 allows data and commands to be entered.

Naturally, it is understood that if the processing or storage of data requires a unit which cannot be easily or completely contained in the body 11, the body 11 can be connected, by means of a cable or a wireless connection, to external processing units. A wired connection can also be envisaged to provide external power supply. A plurality of inserts can be alternatively pluggable in a suitable seat 16 at the end of the arm 13. For example, each insert will be suitable for engaging the wrench with a corresponding type and/or dimension of mechanical member or element (screw, nut, etc.) on which the tool is destined to operate.

Although for simplicity's sake inserts having all a similar dimension are shown, elongated inserts or inserts with arms of particular shape can also be provided, as known in the art.

Each insert may comprise internally a transponder in a suitable position (typically in the plugging shank to the seat 16) to be coupled to a suitable antenna close to the seat 16 when it is mounted on the tool.

The manners for coupling between transponder and antenna for the activation of the transponder (usually known as "tag") and the communication are widely known and will therefore not be described in detail here.

The tool comprises sensor means (for example made with strain gauges arranged in the arm) for detecting the torque exerted on the mechanical member. Advantageously, a sensor (for example gyroscopic) can also be provided for detecting the tightening angle. According to one aspect of the present invention, the tool comprises a device for the light signalling of the conditions of execution of the clamping operations.

This device comprises an annular support 2, which is associated with the tool to which a plurality of lighting groups 3 are associated, provided along a circle arch long the ring and each one comprising at least two lighting points 4 (preferably LEDs); the groups 3 are substantially equidistant each other along the ring, each points lightens when the clamping is finished.

Preferably, the device in each group switches on in each point of the plurality of points according to a progressive sequence with all the points switched off before starting the clamping operation until having all the points switched on when the clamping is finished so as to simulate an arch of a circle extending from a point up to its maximum dimension with all the points switched on.

According to a preferred embodiment, the lighting groups are four arches, each one having a dimension slightly lower than 90°.

In this way, in whatever way the tool is gripped at least one of the groups is visible to the operator and therefore also the indication of the correct clamping.

Preferably, an initialisation lighting point 41, for example made by a single LED, is provided between two contiguous lighting groups. This point can provide indications on the status of the tool; for example, it can flash in case of the initialization phase (booting up), it can be steady white when the tool/wrench is ready for clamping etc . . . .

Preferably the lighting points for each group are three. In this way, the clamping sequence is tracked by switching on the first point (which indicates operation started), then by also switching on the second point (clamping in progress), finally by switching on also the third point (reached target) .The points are radially lit on the 4 groups. The switch-on thresholds are suitably configurable to ensure maximum control by the user Furthermore, the lighting points can be realised through RGB LEDs which allow the lighting point to change its colour and/or intensity.

According to a further feature of the present invention, the electronic processing unit can switch on, switch off, change colour and intensity at the lighting points to identify anomalies, or particular tightening conditions etc . . . .

Through these codes it is also possible to show the status of the system and diagnostic output.

Furthermore, by means of light patterns, the indication provided by the device can also be distinguished by colour-blind operators.

The groups of LEDs are fixed to the outer surface of a ring shaped piloting electronic circuit 5 handling the power supply to the LEDs and that is inserted within the annular support 2. Said circuit 5 is provided with an electric contact bus 51 for connecting the device with the electronic unit provided in the body 11 of the tool.

Said support is provided with slots 21 permitting to the LEDs to be visible from the outside. A layer of light diffusion which is adapted to optimize the visibility of the light emitted by the LEDs themselves is provided on these slots and in particular on the annular surface on which the LEDs are arranged.

The annular support and the device in general are preferably provided between the handle 12 and the body 11. Alternatively, it can be arranged between the body 11 and the arm 13, or in any annular section of the tool.

The invention claimed is:

1. A clamping tool comprising:

a display device configured to display tightening conditions, a body, containing control circuits and a processing electronic unit having at one end a handle for gripping by an operator making the clamping, and on the other end an arm, said arm comprising at its free end a seat wherein can be alternatively pluggable a plurality of inserts suitable for engaging the tool with a corresponding type and/or dimension of a mechanical member on which the tool is destined to operate to carry out a clamping operation, sensor means being provided on said arm suitable for detecting tightening conditions exerted on said mechanical member, said display device is controlled by said electronic processing unit and comprises an annular support connected to the tool, to which a plurality of lighting groups are associated, provided along a circle arch long the along a ring and each one comprising at least two lighting points, the groups being substantially equidistant each other along the ring, said points being destined to lighten when the clamping is finished, wherein the processing electronic unit switches on in each point of the plurality of points a progressive sequence with all the points switched off before starting the clamping operation until having all the points switched on when the clamping is finished so as to simulate an arch of a circle extending from a point up to its maximum dimension with all the points switched on, wherein the lighting groups are four arches, each one having a dimension slightly lower than 90°, and wherein the annular support is provided between the handle and the body of the tool.

2. The tool according to claim 1, wherein the lighting points for each group are three.

3. The tool according to claim 1, wherein the lighting points and LED RGB.

4. The tool according to claim 1, wherein the lighting groups are fixed to the outer surface of a ring shaped piloting electronic circuit handling the power supply to the lighting points and that is inserted within the annular support.

5. The tool according to claim 1, wherein said annular support provided with slots permitting to the lighting points to be visible from the outside.

* * * * *